Oct. 6, 1964     H. H. EICHORST     3,151,911
WHIPLASH ARRESTOR
Filed April 19, 1962
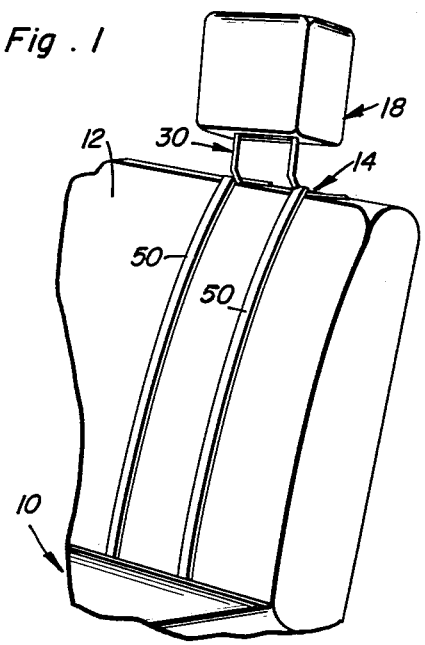
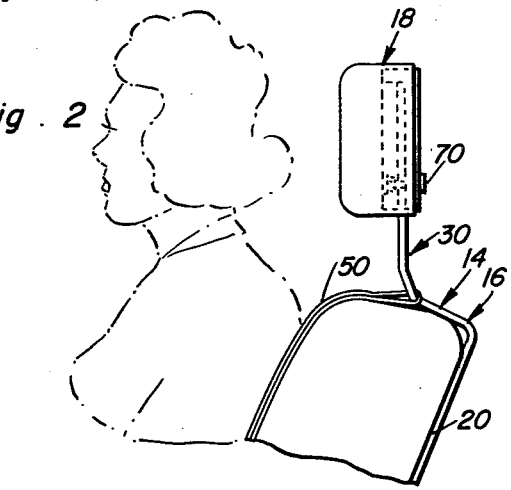
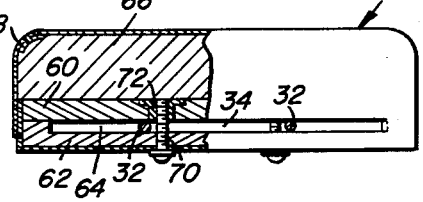
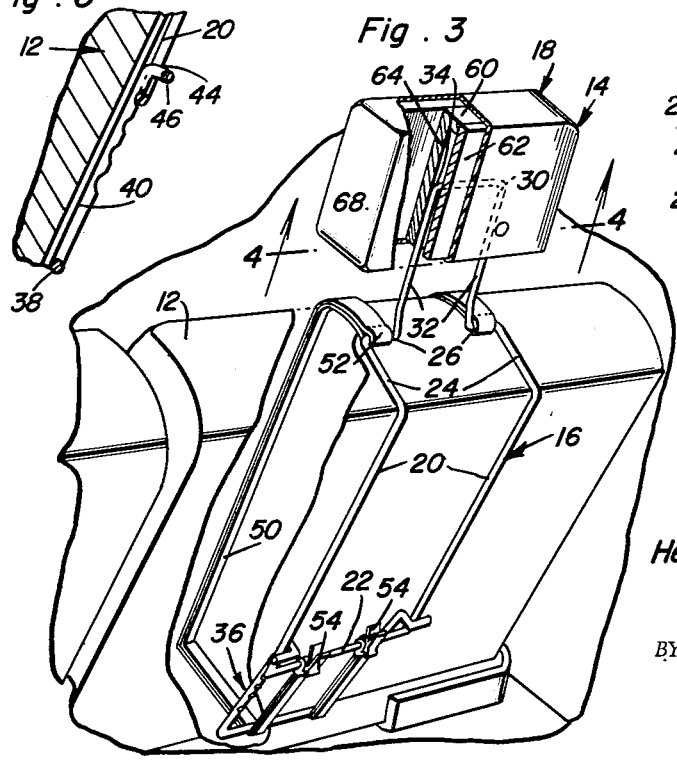
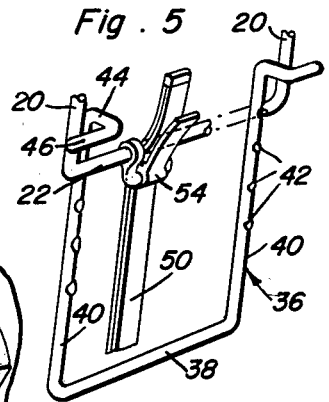
Herman H. Eichorst
INVENTOR.
BY
Attorneys 3,151,911
WHIPLASH ARRESTOR
Herman H. Elchorst, 8119 Long Beach Blvd.,
South Gate, Calif.
Filed Apr. 19, 1962, Ser. No. 188,647
5 Claims. (Cl. 297—397)

This invention comprises a novel and useful whiplash arrestor and more particularly pertains to an emergency safety device specifically adapted for mounting upon the seat backs of automotive vehicles in order to protect the neck and head of the seat occupant from the injurious effects of shock arising from a sudden blow to the rear of the vehicle resulting in a whiplash effect upon the head of the occupant.

It is well known that many automobile accidents which involve a sudden shock or collision with the rear of a vehicle causes a backward whipping of the head and neck of the seat occupants which by virtue of this unexpectedness as well as by the lack of protection afforded by the vehicle seat results in an injury commonly known as whiplash. Although safety belts are employed to increase the safety of vehicle occupants during collisions, they offer no assistance to protecting the head and neck against the often serious effects of such sudden shocks from the rear.

There have been known heretofore head rests associated with vehicle seats which offer a support to the head of the seat occupant in the interest of comfort. However, such devices are entirely incapable of functioning as whiplash arrestors since they lack the necessary strength and rigidity of mounting which will absorb the effects of a whiplash.

It is therefore the primary object of this invention to provide an attachment which may readily be applied to the vehicle seat backs and which will afford an emergency support for the head and neck of the seat occupant and prevent the application of a whiplash shock to the occupant.

A further and very important object of the invention is to provide an attachment in accordance with the foregoing object which shall be so positioned and it is normally out of contact with the head of the seat occupant but is disposed in proper position to afford a resiliently cushioning support for the head and neck in the event of a whiplash action.

A further object of the invention is to provide an attachment in accordance with the foregoing objects which shall have an extremely secure and sturdy attachment to a vehicle seat back, throughout the entire vertical extent of the latter to provide a device capable of withstanding a shock of a very great magnitude even though the seat back frame itself might be incapable of withstanding such shock.

Yet another purpose of the invention is to provide a safety device in accordance with the preceding objects which may be quickly and easily and detachably applied to vehicle seat backs of various types and will accommodate itself to various dimensions of such seat backs.

A still further object of the invention is to provide a device in accordance with the foregoing objects wherein the head cushioning pad element of the device may be vertically adjusted upon the supporting frame of the device to position it at selected positions in accordance with the needs of the user.

A further and more specific object of the invention is to provide an emergency attachment for vehicle seats in accordance with the preceding objects which although of extremely sturdy and durable construction shall be economical to manufacture, compactly applied to the vehicle seat and not unsightly in its appearance, and which shall combine the necessary rigidity of the support for the cushioning pad and yet shall have sufficient resiliency in its attachment to function effectively.

Still another object of the invention is to provide an emergency attachment in accordance with the foregoing objects in which the head cushioning element may be readily adjusted both vertically and laterally as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view showing a portion of a vehicle seat back with the whiplash arrestor of this invention applied thereto;

FIGURE 2 is a fragmentary end elevational view of the arrangement of FIGURE 1 and showing the relative positioning of the cushion pad of the device with respect to the head of the vehicle seat occupant in normal usage;

FIGURE 3 is a fragmentary perspective view, parts being broken away, and showing certain details of the mounting and construction of the whiplash arrestor of this invention in supplied relation to a vehicle seat back;

FIGURE 4 is a horizontal sectional view taken substantially upon the plane indicated by the section line 4—4 of FIGURE 3 and showing the mounting and adjusting structure of the cushion pad element of the device;

FIGURE 5 is a perspective detailed view of a portion of the supporting frame of the device; and FIGURE 6 is a further detailed view in vertical section of the lower portion of the device in its operative position upon a seat back.

In the accompanying drawings numeral 10 designates generally any conventional form of a vehicle seat which includes a seat back 12, the whiplash arrestor of this invention being shown applied thereto indicated generally by the numeral 14. As will be best apparent from FIGURE 3, whiplash arrestor 14 includes a support assembly or support frame indicated generally by the numeral 16 which is adapted to be firmly secured to the seat back 12 and which carries at its upper end at any particular location as set forth hereafter, a head cushion pad indicated generally by the numeral 18.

The support assembly consists of a cradle like frame which embraces the top, bottom, front and back surfaces of the seat back 12 throughout the entire vertical extent of the latter. The support assembly or support frame 16 is therefore of cradle-like contour and consists of a relatively rigid rear portion and a relatively flexible, tensioned front portion and from which rises a standard to which the cushion pad element 18 is adjustably secured.

Referring now especially to FIGURE 3, it will be observed that the support frame or support assembly 16 consists of a rear portion to which is adjustably secured a front portion. The rear portion comprises a single rod-like member which may be of integral construction or of individual elements rigidly attached together in any suitable manner. The rear portion includes a pair of vertical members 20 which at their bottom ends are connected by a transversely extending cross member 22 (see also FIGURE 5). At their upper ends, the members 20 have angularly disposed parallel portions 24 which rest upon and bear against the top surface of the seat back 12. The members 20 extend throughout the major portion of the vertical height of the back of the seat back 12 to a position closely adjacent the lower end thereof so that the L-shaped members 20, 24 will closely conform to the contour of the top surface and back surface of the seat back.

At their extremities, the portions 24 have inturned substantially perpendicular portions 26 directed towards each other and which provide anchor portions for the front section of the device as set forth hereinafter. The rear portion of the support assembly is completed by a U-shaped upstanding support standard indicated generally by the numeral 30 and which consists of a pair of parallel legs 32 which are integrally connected at the lower ends to the extremities of the angulated portions 26, while their upper ends are joined by a transverse bight member 34. At its lower end, the back portion of the support assembly has detachably secured thereto a U-shaped attachment, see FIGURE 5, indicated generally by the numeral 36. This last mentioned element is likewise of a single unitary rod-like element of rigid construction including a bight portion 38 with a pair of parallel legs 40 projecting from the opposite ends of the bight portion. These legs are preferably provided with a series of recesses or notches 42 along their length which are selectively engaged by the cross member 22 of the members 20 so that engagement of the cross member 22 in the notches or recesses 42 will compressively and frictionally retain the member 38 between the members 20 and the back of the seat back as illustrated in FIGURES 3 and 6.

At the upper ends, the legs 40 are provided with hooks consisting of rearwardly directed arms 44 terminating in perpendicularly extending extremities 46 so that the extremities will thus overlie the lower portions of the members 20 and thus prevent accidental disengagement of the member 38 therefrom.

The front portion of the attachment consists of a pair of nylon webs or straps 50 or other such material having a requisite exceptional tensional strength with a limited amount of resiliency. These straps are secured as by loops 52 at their upper ends which embrace the anchor portions 26 previously mentioned and at the lower ends are secured as by buckles or other suitable fasteners 54 to the cross member 22 of the members 20. It will be noted that the webs pass across the upper surface of the seat back, down the front surface thereof, beneath the lower surface of the seat back and then up the backside of the seat back and over the bight portion 38 of the member 36 before their junction with the cross member 22.

As a result of this structure it will be readily apparent that the webs 50 provide a means whereby the support assembly consisting of the rigid back portion and the tensioned front portion may be readily applied to different sizes of vehicle seat backs.

The length of the upper angulated portions 24 is such as to position the anchor portions 26 at about the midportion of the top surface of the seat back as will be best apparent from a consideration of FIGURES 2 and 3.

Considering next the construction and mounting of the cushion element 18 of the device, attention is now directed particularly to FIGURES 3 and 4. From these figures it will be understood that this element comprises a pair of mounting plates consisting of a base plate 60 together with a removably secured clamping plate 62. The clamping plate 62 is provided with a slot opening upwardly from the lower end thereof as indicated at 64 in which is slidably received the upper end of the U-shaped support standard 30. A block of a resiliently deformable elastomeric material such as rubber, a suitable plastic or the like as indicated at 66 is secured to the base plate 60 and is positioned between the latter and the head of the seat occupant, as shown in FIGURE 2, and is retained in place by an enclosing covering 68 of any suitable pliable sheet material which thus embraces the entire assembly of the block 66, the base plate 60 and the clamping plate 62, there being of course a slit provided in the lower end thereof for the reception of the U-shaped support standard 30.

In order to adjustably secure the cushion pad element 18 to the support standard 30 there is provided fastening means in the form of screws 70 extending through the clamping plate and being received in recessed embedded nuts 72 provided in the base plate 60 as shown in FIGURE 4. It will thus be apparent that by releasing the clamps, the cushion element 18 may be raised or lowered with respect to the seat back as may be desired in order to position it at a proper elevation above the seat back for an individual user. Upon tightening the clamping means 70, the cushioning pad will be locked in its desired adjusted position.

It is a very important feature of this invention that the support standard 30 shall rise from about the midportion of the top surface of the seat back between its front and back sides and that the cushioning element 18 shall be positioned both in vertically spaced relation to the top of the seat back and also a sufficient distance rearwardly of the front face of the seat back and of the back of the head of the seat occupant in normal use so as to provide a slight but definite clearance therebetween as for example, in the order of about two inches. With this arrangement, the head of the seat occupant is not in contact with the device except when a severe shock to the rear of the vehicle imparts a whiplash effect, at which time the back of the head will during its backward travel engage the cushioning element 18 thus preventing the application of sudden unexpected strains to the head and neck of the occupant.

The element 36 functions both as a means to more effectively retain the lower ends of the members 20 against the seat back and also serves both as a support means and as a pressure means over which the holds of the nylon webbing 50 are entrained as they pass from beneath the bottom surface of the seat back and extend upwardly along the backside of the seat back into engagement with the cross bar 22 of the members 20.

The construction as previously disclosed offers a wide variety of adjustments in order to dispose the attachment to the best advantage in different positions upon an auto seat and also upon different makes of seats. Further, the adjustable mounting of the cushion pad 18 upon the standard 30 accommodates both vertical or lateral adjustment or both.

The vertical positioning of the legs 32 and the transverse member 34 in the slot 64 on the pad 18 allows for precise vertical positioning of the pad, which is retained thereat by the clamping screws 70. Ordinarily, the legs 32, as shown in FIGURE 4 will be positioned centrally of the slot 64 and by straddling the screws 70 will be retained in a laterally central position. However, by removing a fastener screw 70, the pad may be shifted to laterally adjusted positions on the support standard within the limits of the slot 64. Consequently any desired position of independent or of combined vertical and lateral adjustment may be obtained.

From the foregoing, it will be observed that the cushioning element 18 is positioned in a novel location with respect to the seat back and the head of the seat occupant so that it will be adjustably positioned out of contact with the head of the occupant in normal occupancy of the seat but will be instantly available to prevent unnatural rearward head rolling movement or whiplash effects applied to the neck and head of the occupant. The device enables ready adjustability to fit different sizes of vehicle seats and to accommodate individual occupants thereof. By the location of the support stand at the midportion of the top surface of the seat back, a location is obtained which will maintain the cushion out of contact with the head of the occupant except in an emergency and also will position the cushion element in such a manner that it will occasion no obstacle to persons occupying the backseats of a vehicle behind the attachment nor will it interfere with the line of vision of the vehicle driver from his rearview mirror.

The rigid components of the attachment are firmly and fixedly secured to the seat back in a sturdy and secure manner, engaging the seat back from the entire top to the bottom thereof. The front component of the attachment is of a material capable of sustaining very high loads such as about thirteen hundred pounds and is tensioned in order to firmly anchor the device to the seat. When so mounted, the attachment of the device to the seat is more secure and sturdy then the actual strength of the seat back frame so that the device will withstand any load to which the seat itself can be subjected.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A whiplash arrestor for vehicle seats comprising a support assembly secured to a vehicle seat back, said support assembly including a rigid frame engaging the top and back surfaces of a seat back, the lower end of said frame terminating at substantially the bottom edge of the back surface, and the upper end of said rigid frame terminating on said top surface at an intermediate point between the front and rear edges thereof, a cushioned standard rigidly secured to said upper end of said frame and projecting upwardly above the top surface of the seat back, and flexible tension strap means engaging the top, front and bottom surfaces of the seat back and secured under tension to the opposite end portions of the rigid frame, said standard projecting upward in a plane rearward of the front surface of the vehicle seat back so as to be spaced rearwardly and out of contact with the head of a seat occupant under normal circumstances, said cushioned standard including a rigid vertical standard and a cushioning pad having a vertical slot therein receiving the vertical standard, said slot being of a depth so as to allow for a vertical adjustment of the pad on the vertical standard, and said slot being of a length so as to allow for a lateral adjustment of said pad on the vertical standard, and releasable fastening means securing said pad in an adjusted position to said vertical standard, said rigid frame consisting of upper and lower rigid portions adjustably engaged with and interlocked to each other so as to vary the length of that portion of the rigid frame engaged with the back surface of the seat back, the upper rigid portion of the rigid frame consisting of a pair of upstanding members engaging the back surface of the seat back, a cross member joining the lower ends of said upstanding members, the upper ends of said upstanding members having laterally directed forwardly extending generally parallel arms resting on the top surface of said seat back, said arms terminating in inwardly extending aligned anchor portions, the vertical standard being secured to the inner ends of the anchor portions, said lower rigid portion of the rigid frame consisting of a pair of parallel upwardly projecting legs, a cross member joining the lower ends of said legs, a plurality of laterally aligned vertically spaced notches along the legs selectively receiving the cross member of the upper portion, and a hook portion at the upper end of each of the legs engageable with the upstanding members of the upper portion.

2. A whiplash arrestor for vehicle seats comprising a support assembly secured to a vehicle seat back, said support assembly including a rigid frame engaging the top and back surfaces of a seat back, the lower end of said frame terminating at substantially the bottom edge of the back surface, and the upper end of said rigid frame terminating on said top surface, a cushioned standard rigidly secured to said upper end of said frame and projecting upwardly above the top surface of the seat back, and flexible tension strap means engaging the top, front and bottom surfaces of the seat back and secured under tension to the opposite end portions of the rigid frame, said rigid frame consisting of upper and lower rigid portions adjustably engaged with and interlocked to each other so as to vary the length of that portion of the rigid frame engaged with the back surface of the back, the upper rigid portion of the rigid frame consisting of a pair of upstanding members engaging the back surface of the back, a cross member joining the lower ends of said upstanding members, the upper ends of said upstanding members having laterally directed forwardly extending generally parallel arms resting on the top surface of said seat back, said arms terminating in anchor portions, said lower rigid portion of the rigid frame consisting of a pair of parallel upwardly projecting legs, a cross member joining the lower ends of said legs, and a hook portion at the upper end of each of the legs engageable with the upstanding members of the upper portion at predetermined selected points therealong.

3. A whiplash arrestor for vehicle seats comprising a support assembly mountable on a vehicle seat back, said support assembly including a rigid frame engageable with the top and back surfaces of a seat back, said rigid frame being of a height so as to extend along the full height of the back surface of the seat back, a cushioned standard rigidly secured to the upper end of the frame and projecting upwardly therefrom, and flexible tension strap means secured to the opposite end portions of the rigid frame and engageable about the top front and bottom surfaces of the seat back, said rigid frame consisting of upper and lower rigid portions adjustably engaged with and interlocked to each other so as to vary the length of that portion of the rigid frame which is to engage the back surface of the seat back, the upper rigid portion of the rigid frame consisting of a pair of upstanding members, a cross member joining the lower ends of said upstanding members, the upper ends of said upstanding members having laterally directed forwardly extending generally parallel arms engageable on the top surface of the seat back, said arms terminating in strap anchor portions, said lower rigid portion of the rigid frame consisting of a pair of parallel upwardly projecting legs, a cross member joining the lower ends of said legs, and a hook portion at the upper end of each of the legs engageable at any one of a plurality of selected positions with the upstanding members of the upper portion.

4. The combination of claim 3 wherein the upwardly projecting legs of the lower portion include a plurality of laterally aligned vertically spaced notches therealong for selectively receiving the cross member of the upper portion of the rigid frame.

5. The combination of claim 4 wherein said cushioned standard includes a rigid vertical standard and a cushioning pad having a vertical slot therein receiving the vertical standard, said slot being of a depth so as to allow for a vertical adjustment of the pad on the vertical standard, and said slot being of a length so as to allow for a lateral adjustment of said pad on the vertical standard, and releasable fastening means securing said pad in an adjusted position to said vertical standard.

References Cited in the file of this patent
UNITED STATES PATENTS

| | | |
|---|---|---|
| 497,697 | Wesson | May 16, 1893 |
| 2,613,731 | Roginski | Oct. 14, 1952 |
| 2,661,050 | Felter | Dec. 1, 1953 |
| 2,897,878 | Mungovan | Aug. 4, 1959 |
| 2,973,029 | Schlosstein | Feb. 28, 1961 |
| 3,012,819 | Mungovan | Dec. 12, 1961 |
| 3,018,133 | Mills | Jan. 23, 1962 |
| 3,084,978 | Johansson | Apr. 9, 1963 |